United States Patent Office 3,228,934
Patented Jan. 11, 1966

3,228,934
IMIDAZOLYL DESACETOXY-7-AMINOCEPHALO-
SPORANIC ACID DERIVATIVES
Edward Penley Abraham and Guy Geoffrey Frederick
Newton, Oxford, England, assignors to National Research Development Corporation, London, England,
a corporation of Great Britain
No Drawing. Filed Feb. 14, 1963, Ser. No. 258,618
Claims priority, application Great Britain, Feb. 16, 1962,
6,086/62
4 Claims. (Cl. 260—243)

This invention relates to Cephalosporins. One group of Cephalosporins and intermediates therefor has the structure

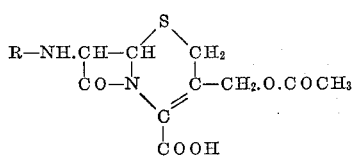

wherein R represents hydrogen or an acyl group.

The nucleus of Cephalosporin C, termed 7-aminocephalosporanic acid, may be produced by the removal of the α-aminoadipoyl side-chain of the parent substance by controlled hydrolytic or other methods whereupon other N-acyl derivatives of the nucleus can then be prepared e.g. as described in co-pending application Serial No. 45,364, filed July 27, 1960, now Patent 3,207,755, and Serial No. 191,213, filed Apr. 30 1962, a continuation-in-part thereof. Thus the phenylacetyl derivative, prepared by treating the nucleus with phenylacetyl chloride, is a more active antibacterial agent than the natural antibiotic.

It has now been discovered that useful derivatives can be obtained by replacement of the acetoxy group of Cephalosporin C, its nucleus or N-acyl derivatives thereof, by an imidazole ring system. The compounds in which the acetoxy group of Cephalosporin C or the acetoxy group of the N-phenylacetyl derivative of 7-aminocephalosporanic acid are replaced by the residue of glyoxaline itself are of particular interest, while compounds in which the acetoxy group is replaced by the residue of an alkyl, particularly methyl, or aryl, particularly phenyl, substituted glyoxaline are also important.

The exact structure of the derivatives varies according to the pH of the solution in which they are dissolved. Thus at pH 4.5, the glyoxaline (imidazole) derivative of Cephalosporin C has the structure

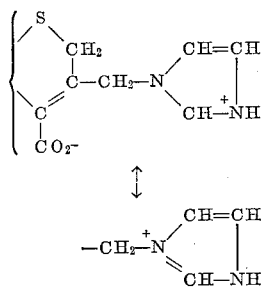

in which the imidazole cation is a resonance hybrid. When the solution is adjusted to a pH of 8 with sodium hydroxide, the probable structure is

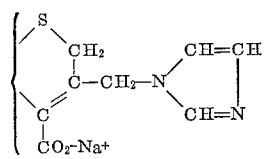

The derivatives of the invention can be prepared by the treatment of Cephalosporin C, its nucleus or N-acyl derivatives thereof with the corresponding imidazole.

The compounds of the invention are of interest as new derivatives of Cephalosporin C having antibiotic activity and resistance to penicillinase, and also as intermediates from which further derivatives of Cephalosporin C can be obtained.

They constitute a new sub-class of compounds in the Cephalosporin series and are the first examples of reaction products of Cephalosporin C (and related compounds) with secondary bases. Some of the new compounds have higher activity than those products typically obtained by the corresponding reaction with tertiary bases.

They may be represented by the following general formula (omitting considerations of Zwitterion formation for simplicity)

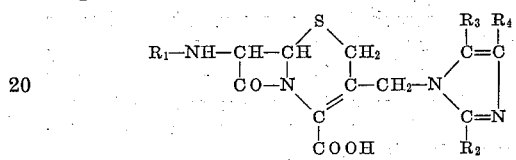

wherein $R_1$ represents hydrogen (in which case the compound is primarily of interest as an intermediate); or an acyl group e.g. α-aminoadipyl; aliphatic acyl groups from formyl up to, say, hexanoyl, and their alkoxy counterparts; mixed aromatic/aliphatic acyl groups such as phenyl acetyl, α-methyl phenyl acetyl, and their aryloxy counterparts e.g. phenoxy acetyl, α-phenoxy propionyl; aromatic acyl groups such as benzoyl and substituted benzoyl groups. In the above formula, $R_2$, $R_3$ and $R_4$ represent hydrogen, alkyl e.g. $C_1$–$C_6$ alkyl, substituted alkyl, aryl groups, halogen or carboxyl, and may be joined together to form a cyclic group.

The invention also includes the non-toxic metal salts of the compounds e.g. sodium, ammonium, and other alkali metal salts, and the acid addition salts derived from the basic nitrogen atoms of the imidazole ring.

The new compounds are produced by reacting a compound of formula

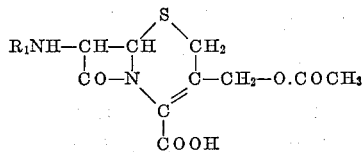

with a base of formula

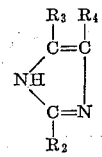

wherein $R_1$ to $R_4$ have the significance mentioned above.

Examples of bases other than imidazole are 4-methyl imidazole, 4-ethyl imidazole, 4-bromo imidazole, 4-phenyl imidazole, and 4-β-aminoethyl-imidazole.

The following examples illustrate the invention:

*Example 1.—Formation and properties of an imidazolyl derivative of Cephalosporin C*

Cephalosporin C sodium salt (5.8 mg.) was dissolved in water (0.29 ml.) and imidazole (19.7 mg.) was added to the solution. The solution was then kept at 37° for 18 hours. Samples (5 μl.) of the resulting solution were then analysed by electrophoresis and chromatography on paper followed by bioassay and coloration with ninhydrin. The results showed that a new ninhydrin-positive compound had been formed with activity against *Salm. typhi* and

*Staph. aureus.* The properties of this compound were those expected of an imidazolyl derivative of the structure shown, containing a weakly basic nitrogen in the imidazole ring with a pKa in the region of 7.

On electrophoresis in pyridine acetate buffer pH 4.5 (14 v./cm. for 2.5 hr.) the new active compound behaved as though it had no net charge. Under similar conditions Cephalosporin C showed one net negative charge and migrated 5.7 cm. towards the anode.

On electrophoresis in collidine acetate buffer pH 7.0 (14 v./cm. for 2.5 hr.) the new active compound showed a fraction of one net negative charge and migrated 1.4 cm. towards the anode. Under similar conditions Cephalosporin C carried one full net negative charge and migrated 3.5 cm. towards the anode.

On electrophoresis in 10% acetic acid (pH 2.3) (14 v./cm. for 2.5 hr.) the new active compound carried a positive charge and migrated 3.3 cm. towards the cathode. Under similar conditions Cephalosporin C showed virtually no net charge.

When chromatographed on paper in n-butanol-acetic acid-water (4:1:4 by vol.), the new compound showed an $R_F$ value which was 0.4 times that for Cephalosporin C.

*Example 2.—Formation and properties of an imidazolyl derivative of the N-phenylacetyl derivative of 7-aminocephalosporanic acid (7-ACA)*

Phenylacetyl derivative of 7–ACA (2 mg. of the sodium salt) was dissolved in 0.1 ml. water and 6.8 mg. of imidazole were added. The solution was kept at 37° for 18 hrs. It was then diluted 100 times with water and samples (5 μl.) of the diluted solution were analyzed by electrophoresis on paper followed by bioassay, *Staph. aureus* being used as the test organism.

On electrophoresis in pyridine acetate at pH 4.5 (14 v./cm. for 2.5 hours) the new active compound showed no net charge. Under similar conditions the phenylacetyl derivative of 7–ACA showed one net negative charge and migrated 6 cm. towards the anode.

On electrophoresis in collidine acetate pH 7.0 (14 v./cm. for 2.5 hours) the new active compound carried a fraction of one net negative charge migrating about 0.3 times as fast towards the anode as the phenylacetyl derivative of 7–ACA.

On electrophoresis on 10% acetic acid, pH 2.2 (14 v./cm. for 2.5 hours) the new active compound carried a positive charge and migrated 2.3 cm. towards the cathode. Under the same conditions the phenylacetyl derivative of 7–ACA still showed a fraction of one net negative charge and migrated a short distance towards the anode.

*Example 3.—Preparation of an imidazole derivative of the N-phenylacetyl derivative of 7-aminocephalosporanic acid*

A solution of the sodium salt of the N-phenylacetyl derivative of 7-aminocephalosporanic acid (30 mg.) in water (1.5 ml.) was adjusted to pH 2 by the addition of 0.1 N-HCl and shaken twice with one vol. of butyl acetate. The butyl acetate extracts were combined and washed once with a little water. A solution of imidazole (105 mg.) in butyl acetate (1.2 ml.) was then added. After a few minutes the imidazole salt of the N-phenylacetyl derivative of 7–ACA crystallized from the mixture. The crystals were washed with ether, dried, and then dissolved in a solution of imidazole (105 mg.) in water (1.5 ml.). This solution was kept at 37° for 24 hours and then freeze-dried. Much of the excess imidazole was removed by extraction of the residue with butyl acetate. The remaining gum was dissolved in water (3 ml.) and the pH of the solution brought to 5.0 by addition of Dowex-50 (H form). The resin was separated and washed with a little water. The supernatant and washings combined were passed through a column (4 cm. x 1 cm. diam.) of Dowex-1 in the acetate form and the column eluted with 0.5 N-acetic acid, fractions of 1 ml. being collected. The required imidazole derivative emerged from the column in fractions 2–6. These fractions were combined and freeze-dried to yield a preparation of the imidazole derivative as a white powder which was shown by electrophoresis on paper at pH 4.5 to be free from the N-phenylacetyl derivative of 7–ACA. The ultraviolet absorption spectrum of an aqueous solution of this preparation showed $\lambda_{max}$ 256 mμ. The solution was assayed by the holeplate method against *Staph. aureus* and *Salm. typhi* and the maximum concentration of pure imidazole derivative which it contained was estimated of its extinction at 260 mμ on the assumption that the molar extinction of the imidazole derivative was the same as that of Cephalosporin C. The calculated activity of the pure imidazole derivative was 3,600 units/mg. against *Staph. aureus* and 25 units/mg. against *Salm. typhi* (Cephalosporin C has an activity of 10 units/mg. against both organisms).

We claim:

1. N-imidazolyl desacetoxy Cephalosporin C.
2. N-imidazolyl desacetoxy - 7 - aminocephalosporanic acid.
3. N-imidazolyl desacetoxy-7-phenylacetamide-cephalosporanic acid.
4. A compound selected from the group consisting of compounds of the formula:

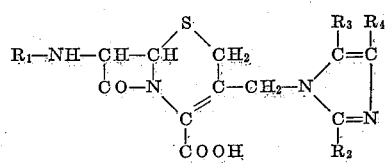

wherein $R_1$ is selected from the group consisting of hydrogen, α-aminoadipyl, alkanoyl and alkoxyalkanoyl of 1 to 6 carbon atoms, and acyl of the formula $R_5R_6CR_7CO$ wherein $R_5$ and $R_6$ are selected from the group consisting of hydrogen, lower alkyl and lower alkoxy of up to 6 carbon atoms, phenyl acetyl, α-methyl phenyl acetyl, benzoyl, phenoxy acetyl, α-methyl phenoxy acetyl and α-phenoxy propionyl and $R_7$ is selected from the group consisting of hydrogen and methyl, and wherein $R_2$, $R_3$ and $R_4$ are selected from the group consisting of hydrogen, alkyl of 1 to 6 carbon atoms, aminoalkyl of 1 to 6 carbon atoms, phenyl, halogen and carboxyl, and their pharmaceutically acceptable non-toxic metal and acid addition salts.

References Cited by the Examiner

Hackh's Chemical Dictionary, page 21 (1937).
Morton: The Chemistry of Heterocyclic Compounds, page VI of the preface (1946).
Wertheim: Textbook of Organic Chemistry, pages 763–764 (1945).

HENRY R. JILES, *Acting Primary Examiner.*
JAMES W. ADAMS, *Assistant Examiner.*